Patented May 9, 1933

1,907,554

UNITED STATES PATENT OFFICE

WILLIAM HENRY MOSS AND BLANCHE BABETTE WHITE, OF CUMBERLAND, MARYLAND, ASSIGNORS TO CELANESE CORPORATION OF AMERICA, A CORPORATION OF DELAWARE

TOLUENE SULPHONAMIDE ALDEHYDE RESINS AND METHOD OF MAKING THE SAME

No Drawing. Application filed December 5, 1928. Serial No. 324,053.

This invention relates to the preparation of a synthetic resin from toluene sulphonamide and also to coating or plastic compositions containing derivatives of cellulose and particularly organic derivatives of cellulose.

An object of our invention is to prepare a synthetic resin that is compatible with derivatives of cellulose and therefore suitable for use in films, lacquers or other coating compositions or plastics containing such derivatives of cellulose.

A further object of our invention is to provide a suitable resin for lacquer or plastic compositions containing organic substitution product of cellulose such as cellulose acetate, which resin is compatible with the other constituents of the lacquers and which produces clear solutions, which upon drying, form films that are adherent, tough, hard and water repellent.

In our application No. 320,209 filed Nov. 17, 1928, we have described the preparation of a toluene sulphonamide-aldehyde resin. In accordance with the said application, such resin is formed by the condensation of equimolecular proportions of para tolune sulphonamide and formaldehyde at elevated temperatures. The resin so formed after purification is then combined with further quantities of toluene sulphonamide to form a new resin. We have now found that if such resin is heated at elevated temperature, a mass containing crystalline substances is formed. In accordance with our present invention, such mass containing the crystalline substances is converted into a resin that is soluble in benzene by heating the same with a quantity of aldehyde such as formaldehyde.

The special synthetic resin formed by our present invention may be employed for making a lacquer or plastic composition which contains one or more derivatives of cellulose and a volatile solvent. The lacquer may also contain one or more natural semi-synthetic resins or gums, one or more plastifiers or softening agents, medium and/or high boiling point solvents and preferably but not necessarily some pigments and/or dyes. The solutions thus formed may be employed as lacquer or coating compositions for metal, glass, wood or other surfaces and may be used for making photographic or other films, etc.

Artificial yarns may be formed by extruding the solutions containing the special resin and a derivative of cellulose through the orifices of a spinnerette either into a heated evaporative atmosphere as in dry spinning, or into a precipitating bath as in wet spinning. The solution may also be employed as an adhesive and is particularly useful in this connection for making shatterless glass by causing inflammable or noninflammable celluloid sheets to adhere to surfaces of sheets of glass between which they are placed.

The plastic containing derivatives of cellulose and our special resin may be worked into sheets which may also be used for laminated glass, and may also be worked into blocks or articles in any known manner. The derivatives of cellulose that may be used for making solutions, coating or plastic compositions and the like comprises any suitable derivatives such as cellulose nitrate or organic derivatives of cellulose. Examples of organic derivatives of cellulose are organic esters of cellulose such as cellulose acetate, cellulose formate, cellulose propionate and cellulose butyrate and cellulose ethers, such as ethyl cellulose, methyl cellulose and benzyl cellulose.

The low boiling point solvent that may be employed may be one or a mixture of two or more of the following: acetone, alcohol, benzene or ethylene dichloride. Examples of medium and/or high boiling point solvents are ethyl acetate, ethyl lactate, tetrachlorethane, benzyl alcohol or dacetone alcohol. Examples of suitable plastifiers are diphenylol propane, monomethyl xylene sulphonamide, ortho or meta ethyl toluene sulphonamide. If desired fire retardants may be added, particularly the very effective bromine derivatives of organic compounds such as brominated tricresyl phosphate. The pigments or dyes that may be used are any of the ordinary pigments or dyes used in the paint or lacquer industry.

Of the natural gums or resins that may be employed, the following may be mentioned: manila, accaroides, Pontianak, kauri, dammar, rosin and shellac. The semisynthetic resin, ester gum, which is the glycerol ester of rosin, may also be added. Examples of other synthetic resins that may be used in conjunction with our resin are the fusible and soluble phenol formaldehyde or diphenylol propane-formaldehyde resins, preferably prepared in the presence of acid catalysts, and phenol-furfural resins and toluene sulphonamide and furfural resins.

The following is a detailed description of one mode of preparing our resin.

Equimolecular proportions of p-toluene sulphonamide and formaldehyde are heated together under reflux at 100 to 150° C. for from 16 to 20 hours, preferably in a jacketed vessel having oil or other heating medium in the jacket. Either an acid or alkaline catalyst may be present, but such catalyst is not necessary. The product thus formed may be purified by washing distillation or solution in solvents to remove the excess reactants. The resin thus formed is then heated to 200 to 260° C. preferably 245° to 250° C. for 15 to 30 minutes under reflux. Alternately we may heat the resin at 130 to 150° C. for 4 to 20 hours not under reflux, but either open to the air or arranged so that any volatile substances present may be distilled away. To the product thus formed, proportions of toluene sulphonamide up to 25% of the weight thereof is then added, and the same heated to temperatures of 130 to 150° C. for 1 to 4 hours.

The resin thus formed is then heated at a temperature of 160 to 200° C., preferably about 175° C. for from 4 to 8 hours and the same is thus converted into a dark greenish brown resinous mass which consists almost entirely of two crystalline substances both of which are largely insoluble in benzene. This resinous material has a distinct fluorescence and a darker color than the toluene sulphonamide resin before described. While the exact composition and formula of these substances cannot be given, one of them in the crude state in which it separates from a benzene solution melts at 140 to 150° C., while the second one melts at 160 to 162° C. To this mass containing these crystalline substances a formaldehyde solution containing 40% of formaldehyde is added in amounts equal to 50% of the weight of the mass and the same is heated at 120 to 150° C. for from 6 to 12 hours.

The product thus formed is a soft light brown semicrystalline mass which does not have the appearance or the properties of a resin and is not compatible with cellulose acetate. This semicrystalline mass is then fused in an open vessel or in a vessel fitted with an outlet pipe in such a way that refluxing does not occur at a temperature of 130 to 150° C. for from 2 to 6 hours.

The product of this fusion is a clear, transparent light brown resin. It is completely soluble in benzene and the benzene solution thereof does not deposit any crystalline compounds on standing. This resin is compatible with cellulose acetate and cellulose nitrate and can be used with these cellulose derivatives in all the technical applications as above described. This resin has a distinct green fluorescence and a darker color than the toluene sulphonamide resins before described.

The following examples are given to illustrate the use of our special resin in connection with derivatives of cellulose.

*Example I*

A coating composition containing the resin may be made as follows:

| | Parts |
|---|---|
| Cellulose acetate | 10 |
| Toluene sulphonamide formaldehyde resin | 1 to 20 |
| Acetone | 100 |

*Example II*

The following is another example of coating composition.

| | Parts |
|---|---|
| Cellulose acetate | 10 |
| Toluene sulphonamide formaldehyde resin | 1 to 20 |
| Acetone | 50 |
| Benzene | 25 |
| Alcohol (ethyl or denatured) | 25 |
| Diacetone alcohol | 20 |

*Example III*

The following is an example of a solution that is suitable as an adhesive, and is particularly useful for causing a sheet of celluloid containing cellulose acetate, cellulose propionate or cellulose butyrate to adhere to surfaces of sheets of glass, cardboard, asbestos, metal, etc.

| | Parts |
|---|---|
| Cellulose acetate | 20 |
| Toluene sulphonamide formaldehyde resin | 25 |
| Acetone | 60 |
| Ethyl acetate | 30 |
| Ethyl lactate | 10 |

*Example IV*

The following is an example of a plastic composition.

| | Parts |
|---|---|
| Cellulose acetate | 100 |
| Toluene sulphonamide formaldehyde resin | 40 |
| Monomethyl xylene sulphonamide | 10 |
| Alcohol | 50 |
| Benzene | 50 |

*Example V*

The following is an example that may be employed for making artificial yarn by extruding through the orifices of a spinnerette, into a heated evaporative atmosphere.

| | Parts |
|---|---|
| Cellulose acetate | 100 |
| Toluene sulphonamide formaldehyde resin | 20 |
| Acetone | 400 |

*Example VI*

The following is a formula for pigmented lacquer:

| | Parts |
|---|---|
| Cellulose acetate | 20 |
| Toluene sulphonamide formaldehyde resin | 25 |
| Diphenylol propane | 10 |
| Pigment | 10 |
| Acetone | 100 |
| Ethyl acetate | 20 |
| Benzene | 20 |
| Toluene | 10 |
| Ethyl lactate | 20 |

The following examples are given to illustrate the use of toluene sulphonamide resin in connection with cellulose nitrate for various purposes:

(a) Coating composition may contain:

| | |
|---|---|
| Cellulose nitrate | 6 kilograms |
| Camphor | 2 kilograms |
| Diethyl phthalate | 2 kilograms |
| Resin | 10 kilograms |
| Benzene | 20 liters |
| Alcohol | 20 liters |
| Butyl alcohol | 20 liters |
| Butyl acetate | 20 liters |
| Ethyl acetate | 30 liters |

(b) An adhesive solution suitable for use in the preparation of laminated glass having a sheet containing cellulose nitrate or cellulose ethers may contain:

| | |
|---|---|
| Cellulose nitrate | 0.4 kilogram |
| Camphor | 0.1 kilogram |
| Dibutyl phthalate | 0.1 kilogram |
| Resin | 1 kilogram |
| Benzene | 20 liters |
| Alcohol | 10 liters |
| Butyl alcohol | 20 liters |
| Butyl acetate | 20 liters |
| Ethyl acetate | 30 liters |

In the foregoing examples, the cellulose acetate may be replaced by cellulose propionate, cellulose butyrate, etc. Either the cellulose acetate or the cellulose nitrate may be replaced by cellulose ethers.

As previously stated, it is also permissible to replace a part of the resin or add to it other synthetic and natural resins.

In any or all of the above formulæ, the solvents used may be anhydrous or there may be added to them 1 to 10% or more of water, in any cases where a cellulose acetate is used, which is more soluble in acetone-water than in acetone alone, or if it is desired for other reasons.

It is to be understood that the foregoing detailed description is given merely by way of illustration and that many variations may be made therein without departing from the spirit of our invention.

Having thus described our invention, what we claim and desire to secure by Letters Patent is:

1. Method of preparing a synthetic resin comprising reacting an aldehyde with the mass formed by heating the resin obtained by the condensation of a toluene sulphonamide aldehyde resin with additional toluene sulphonamide.

2. Method of preparing a synthetic resin comprising reacting formaldehyde with the mass obtained by heating the resin formed by the condensation of a toluene sulphonamide formaldehyde resin with additional toluene sulphonamide.

3. Method of preparing a synthetic resin comprising reacting of toluene sulphonamide aldehyde resin with additional toluene sulphonamide, heating the resultant mass until crystalline substances are formed and then reacting the same with an aldehyde.

4. Method of preparing a synthetic resin comprising reacting a toluene sulphonamide formaldehyde resin with additional toluene sulphonamide, heating the resultant mass until crystalline substances are formed and then reacting the same with formaldehyde.

5. Method of preparing a synthetic resin comprising reacting an aldehyde with the mass formed by heating the resin obtained by the condensation of a toluene sulphonamide aldehyde resin with additional toluene sulphonamide, and fusing the resultant mass without refluxing.

6. Method of preparing a synthetic resin comprising reacting formaldehyde with the mass obtained by heating the resin formed by the condensation of a toluene sulphonamide formaldehyde resin with additional toluene sulphonamide, and fusing the resultant mass without refluxing.

7. Method of preparing a synthetic resin comprising reacting a toluene sulphonamide aldehyde resin with additional toluene sulphonamide, heating the resultant mass until crystalline substances are formed, then reacting the same with aldehyde, and finally fusing the mass without refluxing.

8. Method of preparing a synthetic resin comprising reacting a toluene sulphonamide formaldehyde resin with additional toluene sulphonamide, heating the resultant mass until crystalline substances are formed, then reacting the same with formaldehyde, and finally fusing the mass without refluxing.

9. A synthetic resin formed by the reaction of an aldehyde upon the mass obtained by heating the resin formed by the condensation of a toluene sulphonamide-aldehyde resin with additional toluene sulphonamide.

10. A synthetic resin formed by the reaction of formaldehyde upon the mass obtained by heating the resin formed by the condensation of a toluene sulphonamide-formaldehyde resin with additional toluene sulphonamide.

11. A synthetic resin formed by the reaction of an aldehyde upon the mass obtained by heating the resin formed by the condensation of a toluene sulphonamide-aldehyde resin with additional toluene sulphonamide, and fusing the resultant mass without refluxing.

12. A synthetic resin formed by the reaction of formaldehyde upon the mass obtained by heating the resin formed by the condensation of a toluene sulphonamide-formaldehyde resin with additional toluene sulphonamide, and fusing the resultant mass without refluxing.

In testimony whereof, we have hereunto subscribed our names.

WILLIAM HENRY MOSS.
BLANCHE B. WHITE.